United States Patent [19]

Haberle et al.

[11] 3,787,634

[45] Jan. 22, 1974

[54] SYSTEM FOR CONTROLLING THE TRANSMIT TIME OF STATIONS WHICH ARE IN COMMUNICATION WITH ONE ANOTHER VIA A SATELLITE

[75] Inventors: Heinz Haberle; Eberhard Herter, both of Stuttgart, Germany

[73] Assignee: International Standard Electric Corporation, New York, N.Y.

[22] Filed: Oct. 13, 1972

[21] Appl. No.: 297,554

Related U.S. Application Data

[63] Continuation-in-part of Ser. No. 83,912, Oct. 26, 1970, abandoned.

[30] Foreign Application Priority Data

Nov. 12, 1969 Germany .................. P 19 56 867.3

[52] U.S. Cl. ................................ 179/15 BS, 325/4

[51] Int. Cl. ........................................... H04j 3/06

[58] Field of Search 179/15 BS, 15 BA; 178/65.5 R; 325/4

[56] References Cited

UNITED STATES PATENTS

| | | | |
|---|---|---|---|
| 3,548,108 | 12/1970 | Yamamoto | 179/15 BS |
| 3,562,432 | 2/1971 | Gabbard | 179/15 BS |
| 3,643,031 | 12/1972 | Sasaki | 325/4 |

*Primary Examiner*—Ralph D. Blakeslee
*Attorney, Agent, or Firm*—C. Cornell Remsen, Jr. et al.

[57] ABSTRACT

This relates to timing control of message bursts in a TDMA communication satellite system. Each ground station stores information as to both its time slot of transmission and duration of transmission as determined by a master station. The timing control is derived by comparing the received timing information with the stored timing information. When a difference is detected, the transmit timing is altered as required to carry on communication and maintain complete frame fill even when certain stations of the system are not involved in communication.

8 Claims, 2 Drawing Figures

PATENTED JAN 22 1974 3,787,634

INVENTORS

EBERHARD HERTER
HEINZ HÄBERLE

BY Alfred C. Hill

AGENT

SYSTEM FOR CONTROLLING THE TRANSMIT TIME OF STATIONS WHICH ARE IN COMMUNICATION WITH ONE ANOTHER VIA A SATELLITE

CROSS-REFERENCE TO RELATED APPLICATION

This is a continuation-in-part application of copending application Ser. No. 83,912 filed Oct. 26, 1970, now abandoned.

BACKGROUND OF THE INVENTION

Time division multiple access (TDMA) systems permit radio communication among a large number of earth stations via a satellite. In the most simple case the satellite acts as a repeater station serving several fixed point-to-point communications. By providing additional equipment, and, hence, a corresponding additional expenditure, channel-wise relaying of the point-to-point communication becomes possible.

Pulse code modulation (PCM), for example, is used as the modulation method. The PCM-pulses of the individual stations are transmitted to the satellite in the form of message bursts. Transmitting time positions of the individual bursts are chosen so that they will arrive at the satellite in successive time sequence without overlapping.

In an asynchronously operating TDMA system, the PCM frames are subjected to compression at each earth station. But there are still included some additional control pulses. First, these additional control pulses include a sequence of synchronization bits for effecting the carrier and bit synchronization of the burst. (Synchronization must be effected separately with respect to each burst, because transit-time variations may affect the phase relation of the burst, and because the individual earth stations are not synchronized among each other.) Second, the additional control pulses further include a code word for (1) exactly identifying the beginning of the burst (starting code), (2) for identifying the transmitting station (sender address), and (3) eventually for switching information. The starting code and the sender address are adjacent parts of the code word. The starting code is the same in each control word and the sender address is different for each station. The switching information is transmitted via a service channel.

Moreover, there is provided a safety spacing between the bursts, preventing the bursts from overlapping. The individual channels are combined in the known way to form one total frame.

The division of the total frame among the participating stations is to be effected, if possible, in accordance with traffic requirements. A division in accordance with traffic requirements, however, is only possible in cases where this division, at regular intervals, is newly determined by a master or guide station, and is currently made known to all other stations. But also when only considering the control problem for placing the bursts in their proper position in a frame without overlapping, the master station still proves to be of advantage. The controlling of the burst positions and burst lengths can be checked at each station, and control deviations are prevented from appearing at any point.

The basic idea of this control is as follows: The master station, based on the received system-internal information (e.g. in the signal channels), as well as based on external information concerning occupancy of the remaining network, and in accordance with given rules, computes a way of optimum distribution. In the course of this distribution, the entire frame is divided without leaving a remainder. In cases where not all bursts participate in the traffic, the frame is divided among the participating stations without leaving a remainder. The order of sequence of the bursts of the individual stations within the total frame remains unchanged during the entire operation. From time to time, the master station must provide a free time slot for the first access of those stations which want to start their participation in the system.

SUMMARY OF THE INVENTION

It is an object of the present invention to provide a system for controlling the transmit time of bursts within a total frame of one or more stations, which are in communication with one another via a satellite, and with the aid of which the transmit times can be controlled in a simple way.

A feature of the present invention is the provision of a system within each of a master station and a plurality of other stations in communication with each other via a satellite for controlling the transmission time of a message burst in a given time slot of a total frame time allocated to all of the stations comprising first means to store information indicating the time slot for transmission from the associated one of said stations as determined by and received from the master station; second means to receive signals indicating the beginning of said total frame time; third means coupled to the second means responsive to the received signals of the beginning of the total frame time to determine information relative to the given time slot presently employed by the associated one of the stations; and fourth means coupled to the first and third means to compare, at the start of transmitting a new message burst, the stored information and the determined information to produce a timing control signal to control the transmission time of the next message burst when a difference between the stored and determined information is detected.

According to the invention this is accomplished in that one master station determines the time of the time slot to be used by each of the stations in the system within the total frame, and informs each of the stations the time of its assigned time slots and each of the stations store these values, that each station, upon commencement of each received total frame, starts a time-metering arrangement whose momentary reading, upon commencement of a new burst, is compared with the time of the assigned time slot, that in the event of a difference between the assigned and the measured time of the time slot, a control criterion or signal for the next transmission is derived from its own burst, and that simultaneously the difference value is stored as a value of transmit time alteration produced by the control criterion, and in that during subsequently following comparisons, from which there will result a difference corresponding to the value of alteration, there is suppressed the transmission of a control criterion or signal until there has elapsed a delay time which is equal to double the travel time to the satellite.

A further embodiment resides in the fact that in the event of an alteration or control of the transmit time, there is transmitted and stored, in addition to an indication of an altered transmit time, the value of the transmit time alteration, and that each future detected difference value is compared with the value of alteration, and that in the event of a detected difference being in agreement with the value of alteration, a fault indication is prevented from being transmitted.

From this there will result the advantage that the transmit times for the individual bursts, can be displaced at will.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENT

Figure 1:
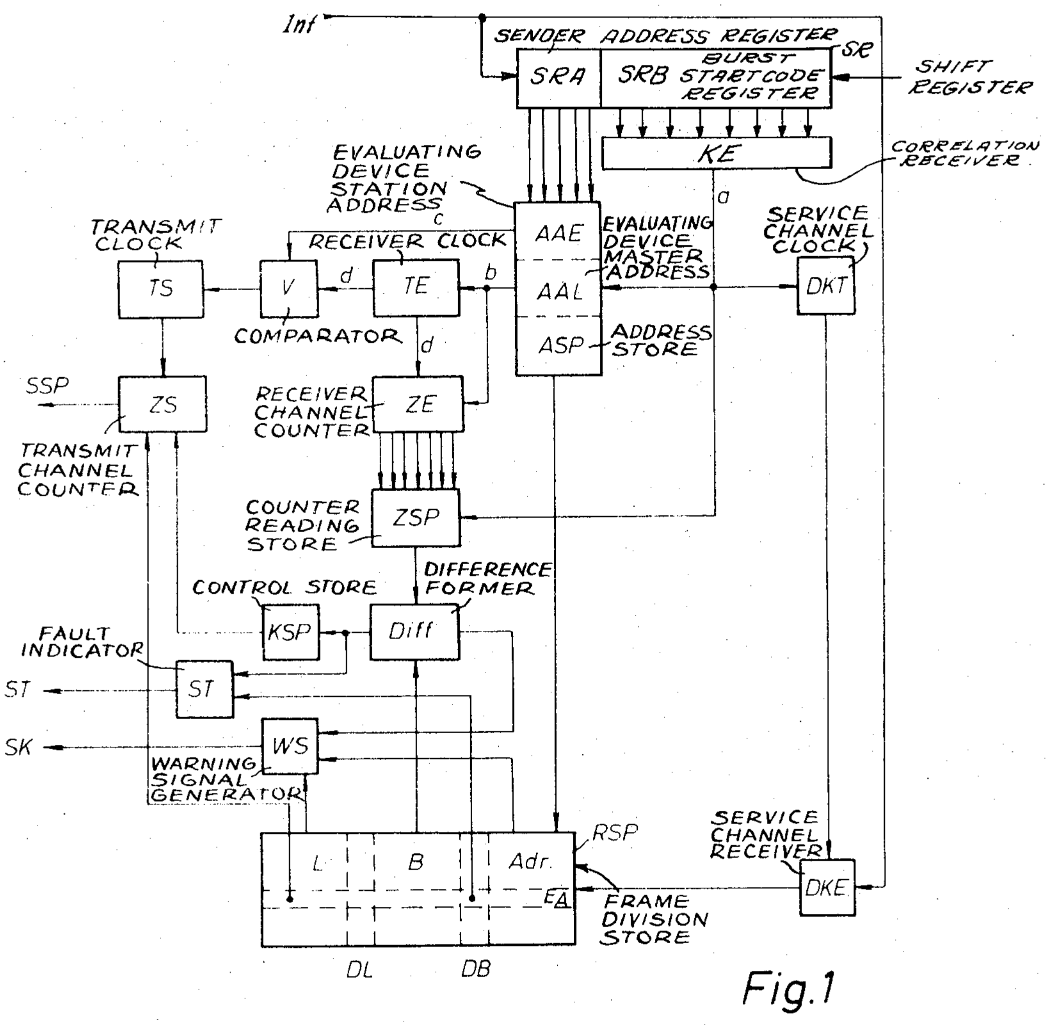
FIG. 1 shows a block diagram of the control system in accordance with the principles of the present invention.

In the drawing there are only shown those elements which are absolutely necessary for understanding the invention.

Figure 2:
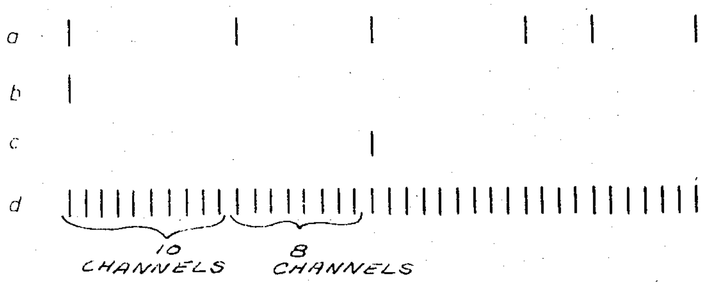
FIG. 2 shows different signals as appearing in the control system of FIG. 1.

The received information Inf is applied to a shift register SR for control purposes. The shift register has two sections SRA and SRB and the received information is shifted from left to right through both sections. If, in section SRB of the shift register there appears a starting code for a burst of any of the stations, this starting code is evaluated by the correlation receiver KE connected thereto and which then causes the transmission of a pulse *a* (FIG. 2).

This pulse *a* then causes the transmission of the sender address as contained in section SRA of the shift register, to an address store ASP. Pulse *a* is a writing clock for store ASP. At the same time, the contents of ASP is compared with the code word of its own address which is stored in evaluating device AAE and with the code word of the master station address which is stored in evaluating device AAL. The devices may be National Semiconductor Corp. integrated circuit DM 7200/8200. Upon detection of these addresses, there are then derived in devices AAE and AAL the pulses *c* or *b*, respectively. By clock *b* (received clock from the master station) there is effected the synchronization of the clock generator TE at the receiving end, serving to generate a channel clock *d*. By a comparator V, the clock generator TS at the transmitting end is then controlled in such a way that the phase difference between a pulse *c* and the nearest pulse *d* of the channel clock will become zero.

Pulses *a* also controlls a clock generator for the service channel DKT.

At the master station there is continuously checked the distribution or the relative order of stations within the total frame as will be described in the following. Within one such total frame there is first of all transmitted the master station burst. Accordingly, the pulses *b* as derived therefrom, will respectively identify the beginning of a total frame. The transmit times for the bursts of the individual stations, and the transmit duration are fixed in multiples of the channel clock from the beginning of a total frame. FIG. 2 shows the pulses, which appear in a station, in which transmission is effected by the master station from channel 1 onwards, for the duration of 10 channels, and the next station starts its burst at channel 11 and transmits during 8 channels, etc. with the channels being identified by the pulses in Curve *d*, FIG. 2 and the duration of the burst of each station being controlled by the pulses of Curve *a*, FIG. 2 as derived from the starting code.

The master station continuously transmits the station addresses together with the respective associated transmit times and burst durations to the other stations of the network via the service channel and, in addition, thereto, there is transmitted the information concerning the last transmit time alteration. This data is received at the stations by the service channel receiver DKE in the form of a single shift register, which is controlled by the clock transmitted by the service channel clock generator DKT, and are retransmitted to and stored in the frame division store RSP. The steps and measures necessary for effecting the storing are considered as being known to the art.

On principle, for controlling and regulating the sequences of operation, there is only required the information relating to the associated station, which is contained in the row of store RSP for the associated station address EA. The remaining storage contents merely serve control purposes. Each storage row contains the following sections: Address adr, last difference at the beginning DB, beginning of the transmit time B, last difference of duration DL, and duration of the burst L.

The channel clock *d* at the receiving end controls the stepping of the channel counter ZE, which is always set to 0 by the correlation peak of the master station (clock *b*). In the normal case, the counter counts to e.g. 520. At each beginning of a burst (clock *a*), the momentary counter reading is read into the counter reading store ZSP, and is compared in the difference former Diff with the associate beginning of the transmit time as stored at B in the frame division store RSP. The associated address is simultaneously read into the store for the sender addresses ASP, and by the latter, the frame division store RSP is controlled in such a way that the proper row of store RSP is being read. This control of store RSP is accomplished by employing a single comparator, such as National Semiconductor Corp. integrated circuit DM 7200/8200, to compare the address in SRA with the addresses in RSP and because the order of sequence of the bursts of the individual stations within the total frame remains unchanged during the entire operation, the store RSP is always stepped one row at a time.

For effecting both the difference formation and the reading there is respectively available the entire burst duration. During normal operation, the difference former Diff provides the difference 0, and the reading is effected in the given order of sequence in a line-by-line fashion.

The channel counter ZS at the transmitting end, likewise counts to 520 during normal operation. The transmit time position of the own burst, as well as the switch-on time of the carrier are determined e.g. by the counter reading "0." Section L of the frame division store RSP informs the counter ZS at the transmitting end about the specified duration of the own burst for effecting disconnection of the carrier at the proper time position. The channel counter ZS at the transmitting end then serves to transmit the corresponding information to the transmit store SSP (not shown).

If a positive or negative difference between the position of the counter reading store ZSP and the information stored in section B in the row of the store associated with the just transmitting station is detected by the difference former Diff, and in the cases where there is present the station's own received burst, the channel counter ZS at the transmitting end, is readjusted by this difference (in whole multiples of channels). During normal operation the store SRA for the sender addresses merely serves checking purposes, because the order of sequence of the bursts is known and remains unchanged. Only in cases where one station is momentarily out of operation, this store causes the skipping of the associated row in the frame division store RSP. This occurs when the address in the examined row does not correspond to the address in shift register SRA. This examined row is then skipped by stepping to the next row of store RSP.

However, if there is present the burst of another station, the detected difference in Diff together with the address Adr is transmitted from the frame division store RSP to warning signal generator WS, by which a warning signal is transmitted via the signal channel SK.

After a shifting has been effected, the difference former Diff registers the shifting value until the first shifted burst after the lapse of the group delay time (double the travel time to the satellite) is again received by the receiver. Then the difference 0 (zero) will again appear at the output of the difference former Diff. During this time, after the effected shifting of the transmit time, a shifting may not be performed again. Therefore, the adjust signal is applied by the difference former Diff, via a control store KSP, to the channel counter ZS at the transmitting end. Control store KSP includes therein an arrangement to ensure that after a shifting of the transmit time, equal differences during double the travel time to the satellite, are no longer transmitted to the channel counter ZS at the transmitting end. Moreover, control store KSP serves to make a kind of majority decision, so as to prevent all formed differences by Diff from having an immediate effect upon the channel counter ZS. Store KSP may, for instance, include a comparator in which there are compared the differences derived from two consecutive readings, the first difference being stored for a time sufficient to make the desired comparison.

By means of the readjustment of the channel counter ZS at the transmitting end, as described hereinbefore, it is possible to carry out the entire transmit time control with respect to the bursts in integer multiples of channels. As soon as a new distribution is recored in the frame division store RSP, a difference will result at the output of the difference former Diff. A difference appears at the output because there is now a new starting time for the burst. For evaluating the difference one input, for instance, from store ZSP, is inverted by an integrated circuit inverter SN 7404 made by Texas Instruments, Inc. and this inverted input is added to the other input, for instance, input B from store RSP by an integrated circuit adder SN7483 made by Texas Instruments, Inc. The channel counter ZS at the transmitting end is then readjusted by this difference, thus shifting the transmit time position of its own burst in one step by the desired number of channels. This does not affect the clock derivation for the channel clock TS at the transmitting end, because the phase difference between the correlation peak of the station's own address *c* and the nearest pulse of the clock *d* of the receiving end will remain constant in the case of shifting operations by complete channel widths.

For supervising the station's mode of operation, and after the difference former Diff has detected a difference, this difference value is compared in a fault indicator ST with the value as stored in section "difference at the beginning of the burst DB" of the frame division store RSP. When both values are found to be in agreement, there is concerned a master-station-controlled alteration. However, if the values are not in agreement there may be assumed to exist a faulty control. A fault signal ST is then transmitted in a suitable way.

The described control system not only permits the control of its own station, but to control in the same way any of the participating stations. During normal operation, the output of the difference former Diff either shows "0" or the status of the last alteration DB in the frame division store RSP. Any deviation from this normal operation may be considered as being indicative of a control error at the associated station. This deviation is transmitted in the signal channel SK by warning signal generator WS as a warning signal to the associated station. A majority decision may cause this station to be excluded.

In cases where a sender address is not being received, this will lead to a skipping of the respective row in the frame division store RSP, and the forming of difference in difference former Diff is not carried out. Such a skipping may have different causes. In cases where the associated station is at present not participating in traffic, a "0" is recorded for it in section "length L" of store RSP. In this case the skipping is accepted. In cases, however, where the skipped row has recorded therein a finite length of burst, the skipping (jump) may be considered as being indicative of a "fault." Also in these cases of faults, warning signals are transmitted to the other stations by warning signal generator WS for initiating the corresponding steps and measures to be taken.

While we have described above the principles of our invention in connection with specific apparatus, it is to be clearly understood that this description is only made by way of example and not as a limitation to the scope of our invention as set forth in the objects thereof and in the accompanying claims.

We claim:

1. A system within each of a master station and a plurality of other stations in communication with each other via a satellite for controlling the transmission time of a message burst in a given time slot of a total frame time allocated to all of said stations comprising:

first means to store information indicating the time slot for transmission from the associated one of said stations as determined by and received from said master station;

second means to receive signals indicating the beginning of said total frame time;

third means coupled to said second means responsive to said received signals indicating the beginning of said total frame time to determine information indicating said given time slot presently employed by the associated one of said stations; and fourth means coupled to said first and third means to compare, at the start of transmitting a new message burst, said stored information and said determined information to produce a timing control signal to control said transmission time of the next message burst when a difference between said stored and determined information is detected.

2. A system according to claim 1, wherein said first means further includes a section therein to store said difference between said stored and determined information.

3. A system according to claim 2, further including fifth means coupled to said fourth means to prevent utilization of said timing control signal for a time equal to twice the travel time to said satellite when said difference between said stored and determined information is present during subsequent comparisons.

4. A system according to claim 3, further including sixth means to provide a fault indication coupled to said fourth means and said section, said sixth means being rendered inoperative when said difference between said stored and determined information of a subsequent comparison equals said stored difference between said stored and determined information.

5. A system according to claim 2, further including fifth means to provide a fault indication coupled to said fourth means and said section, said fifth means being rendered inoperative when said difference between said stored and determined information of a subsequent comparison equals said stored difference between said stored and determined information.

6. A system according to claim 1, wherein said determined information and said timing control signal are multiples of a channel clock signal of said system.

7. A system according to claim 1, wherein each of said other stations are in communication with said master station by means of a service channel, and said first means receives said information relating to said time slot for transmission on said service channel.

8. A system according to claim 1, wherein said signals of said total frame time includes a master station address and an address for each of said other stations; and said third means includes a clock responsive to said master station address to produce a receiver clock signal, and a counter coupled to said clock to count said receiver clock signal, said counter being responsive to said address of the associated one of said other stations to read the count of said counter into said fourth means.

* * * * *